(12) United States Patent
Trautmann et al.

(10) Patent No.: US 9,203,305 B2
(45) Date of Patent: *Dec. 1, 2015

(54) PULSE WIDTH MODULATION POWER CONVERTER AND CONTROL METHOD EMPLOYING DIFFERENT SETS OF PID COEFFICIENTS

(75) Inventors: Frank Trautmann, Munich (DE); Armin Stingl, Wörthsee (DE)

(73) Assignee: ZENTRUM MIKROELEKTRONIK DRESDEN AG, Dresden (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/884,291

(22) PCT Filed: Nov. 9, 2011

(86) PCT No.: PCT/EP2011/069725
§ 371 (c)(1),
(2), (4) Date: Oct. 4, 2013

(87) PCT Pub. No.: WO2012/062795
PCT Pub. Date: May 18, 2012

(65) Prior Publication Data
US 2014/0084892 A1 Mar. 27, 2014

(30) Foreign Application Priority Data
Nov. 9, 2010 (EP) .................................. 10190571

(51) Int. Cl.
*H02M 3/157* (2006.01)
*G05B 11/42* (2006.01)
*G05B 13/02* (2006.01)

(52) U.S. Cl.
CPC ............... *H02M 3/157* (2013.01); *G05B 11/42* (2013.01); *G05B 13/024* (2013.01)

(58) Field of Classification Search
CPC ..... H02M 3/156; H02M 3/157; H02M 3/158; H02M 3/335; H02M 2001/0019
USPC .................................. 323/282, 283, 284, 285
See application file for complete search history.

(56) References Cited

U.S. PATENT DOCUMENTS

| | | | | |
|---|---|---|---|---|
| 5,920,600 A | * | 7/1999 | Yamaoka | H03L 7/0805 327/149 |
| 7,038,438 B2 | * | 5/2006 | Dwarakanath | H02M 3/157 323/283 |

(Continued)

FOREIGN PATENT DOCUMENTS

| CN | 1890865 A | 1/2007 |
|---|---|---|
| CN | 2870295 Y | 2/2007 |

(Continued)

OTHER PUBLICATIONS

Office Action dated Jun. 6, 2014 issued for corresponding Taiwanese application No. 100140981.

(Continued)

*Primary Examiner* — Jue Zhang
*Assistant Examiner* — Lakaisha Jackson
(74) *Attorney, Agent, or Firm* — Heslin Rothenberg Farley & Mesiti P.C.

(57) ABSTRACT

In a Pulse Width Modulation power converter and control method, wherein one of the operating modes steady state or load transient is detected. For either of the two operating modes one set of PID coefficients is provided for the control law that controls the duty ratio command. In case a load transient is detected, the KP gain is selected adaptively. Operating mode detection is supported by oversampling the error signal.

10 Claims, 3 Drawing Sheets

(56) References Cited

U.S. PATENT DOCUMENTS

| | | | |
|---|---|---|---|
| 7,088,598 | B2 | 8/2006 | Yang et al. |
| 7,570,037 | B2 * | 8/2009 | Li et al. .................... 323/283 |
| 8,471,544 | B2 * | 6/2013 | Takahashi ............. H02M 3/157 323/266 |
| 2002/0180410 | A1 * | 12/2002 | Brooks .................... 323/282 |
| 2004/0016232 | A1 * | 1/2004 | Warner et al. .................. 60/602 |
| 2008/0252280 | A1 * | 10/2008 | Prodic ................ H02M 3/157 323/283 |
| 2009/0192634 | A1 * | 7/2009 | Fujinaka ........................ 700/42 |
| 2009/0310385 | A1 * | 12/2009 | Maksimovic et al. ....... 363/21.1 |
| 2010/0001705 | A1 * | 1/2010 | Takahashi ............. H02M 3/157 323/283 |
| 2011/0121761 | A1 * | 5/2011 | Zhao ................. H05B 33/0818 315/312 |
| 2011/0193648 | A1 * | 8/2011 | Zhao ....................... H03K 7/08 332/109 |

FOREIGN PATENT DOCUMENTS

| | | |
|---|---|---|
| EP | 1850465 A2 | 10/2007 |
| JP | 2001208749 A | 8/2001 |
| TW | 1285018 B | 8/2007 |
| TW | 200847634 A | 12/2008 |
| WO | 02/101529 A2 | 12/2002 |

OTHER PUBLICATIONS

International Search Report for International Application No. PCT/EP2011/069725, dated Dec. 20, 2011.

Arikatla, V. et al., "An Adaptive Digital PID Controller Scheme for Power Converters" Energy Conversion Congress and Exposition, 2010 IEEE, Piscataway, NJ, Sep. 12, 2010, pp. 223-227.

Effler, S. et al., "Oversampled Digital Power Controller With Bumpless Transition Between Sampling Frequencies" Energy Conversion Congress and Exposition, 2009 IEEE, Piscataway, NJ, Sep. 20, 2009, pp. 3306-3311.

Hwu, K. I, et al., "A Foward Converter Having an FPGA-based PID Controller with Parameters On-line Tuned", IEEE PEDS, 2005, pp. 1239-1243.

Office Action issued in corresponding Taiwanese patent application No. 100140981 dated Jan. 13, 2015.

* cited by examiner

PULSE WIDTH MODULATION POWER CONVERTER AND CONTROL METHOD EMPLOYING DIFFERENT SETS OF PID COEFFICIENTS

CROSS REFERENCE TO RELATED APPLICATIONS

This application is a national stage filing under section 371 of International Application No. PCT/EP2011/069725, filed on Nov. 9, 2011, and published in English on May 18, 2012, as WO 2012/062795 and claims priority of European application No. EP 10190571.9 filed on Nov. 9, 2010, the entire disclosure of these applications being hereby incorporated herein by reference.

TECHNICAL FIELD

The present invention relates to an apparatus and a method for generating pulse width modulation (PWM) signals. The present invention specifically relates to an apparatus and a method for generating PWM signals in switching regulators or power converters.

BACKGROUND ART

A switching regulator is a circuit that uses a power switch, an inductor, and a diode to transfer energy from input to output. In contrast to linear regulators that use a resistive voltage drop to regulate the voltage and lose power in the form of heat a switching regulator does not have a voltage drop and an associated current but instead the current is 90 degree out of phase with the voltage. Due to this, the energy is stored and can be recovered in the discharge phase of the switching cycle. In the art, several types of switching regulators exist dependent on how the switching circuit is arranged, for example step-down (buck), step-up (boost) or inverter (flyback). The switch can be controlled by a PWM signal with duty ratio D that represents the on state during a PWM period. The output voltage is dependent on the duty ratio D and, hence, can be controlled by a controller which consists of an analog-to-digital-converter (ADC), a discrete-time control law, and a digital PWM (DPWM) module. The ADC samples and quantizes the regulated signal, i.e., the output voltage error that is the difference between the output voltage and an output voltage reference. The control law computes the digital duty ratio command D based on the quantized output voltage error. The control law is a given by a PID control law which is configured by a set of PID coefficients, the set comprising the proportional gain Kp, the integral gain Ki and the differential gain Kd and the time delay Td. The digital PWM modulator takes D as input, and outputs a PWM waveform with the commanded duty ratio D at a switching frequency. The PWM waveform has finite time resolution. The sensing and the quantization of other signals such as the load can be added depending on the application and the specific control law used.

In the state of the art, one set of PID coefficients is used. In case a large load transient occurs the response of the PID controller may be slow.

DISCLOSURE OF THE INVENTION

It is therefore an objective of the present invention to provide an apparatus and a method for generating PWM signals that lead to a superior response to load transients over the prior art.

One aspect relates to a pulse width modulation power converter, comprising an output stage that generates an output voltage according to a pulse width modulation signal and an input voltage by means of a switching element. The PWM modulator further comprises means for providing an output voltage reference and an analog digital converter connected to the output stage and the means for providing an output voltage reference. The ADC samples and amplifies a difference between the output voltage and the output voltage reference to generate an error signal. A PID controller connected to the ADC and the switching element wherein the PID controller is configured by a set of PID coefficients determines a duty ratio for a pulse width modulator that generates the PWM signal. The PWM power converter further comprises means for detecting a steady state and a load transient. Two different sets of PID coefficients will be provided for the PID controller, a first set for the steady state and a second set in case a load transient is detected. The two sets are stored in a memory and one of them is selected by selector means.

One aspect of the present invention relates to means for detecting a steady state or a load transient. These means for detecting a steady state or a load transient comprise means for monitoring the error signal and comparing each value of the error signal to its predecessor by generating an error signal difference, preferably by taking into the account the second derivative of the error signal.

One aspect of the present invention relates to the PWM modulator and its triggering. A duty ratio difference of the duty ratio and its predecessor is computed and, in case during an off-time of the pulse width modulation signal, the duty ratio difference exceeds a threshold, the pulse width modulator is triggered to start a new pulse width modulation period. Hence, the response of the modulator to an output voltage drop is superior in terms of speed since the modulator is provided with a refreshed duty ratio before the current PWM period ends. In case the load transient is detected during the on-time of the PWM period the on-time may be simply prolonged.

One further aspect of the present invention relates to the second set of PID coefficients for the transient mode. For the proportional gain Kp, a plurality of nonlinear gain coefficients are provided in a storage means. A nonlinear gain coefficient is adaptively selected dependent on the load transient.

One aspect of the present invention relates to oversampling. The pulse width modulation power converter comprises means for providing the analog-to-digital converter with a first clock frequency and the pulse width modulator with a second clock frequency, wherein the first clock frequency is higher than the second clock frequency.

One further aspect of the present invention relates to oversampling. The PWM power converter comprises a moving average filter for computing a moving average of the error signal.

The present invention further relates to a control method for a power converter wherein an output voltage is generated according to a pulse width modulation signal and an input voltage. An error signal is generated by sampling the output voltage and differencing the sampled output voltage and an output voltage reference. A duty ratio that defines a duty cycle of pulse width modulation signal is determined by means of PID controlling algorithm generating a pulse width modulation signal by providing the duty ratio to a pulse width modulator.

A steady state or a load transient is detected. A first set of PID coefficients is selected in case a steady state is detected and a second set of PID coefficients is selected in case a load transient is detected.

The step of detecting a steady state or a load transient may comprise monitoring the error signal and comparing each value of the error signal to its predecessor by computing an error signal difference, preferably taking into account the second derivative of the error signal. If the error signal difference exceeds a threshold a load transient is detected.

A duty ratio difference of the duty ratio and its predecessor may be computed and, in case during an off-time of the pulse width modulation signal the duty ratio difference exceeds a threshold, the pulse width modulator may be triggered to start a new pulse width modulation period.

A nonlinear gain KP may be selected in case of load transient detection. Adapted nonlinear gains KP have the advantage that a steady state is reached more quickly compared to linear gains.

The output voltage signal and/or the error signal may be oversampled by sampling a plurality of error signals within one PWM period. The oversampling is necessary for the load transient detection since a plurality of duty ratios are compared to its predecessors respectively within one PWM period.

Further, a moving average of the sampled error signal is computed by a moving average filter. This leads to an interpolated error signal with support in between samples provided by the ADC. Moreover, by applying a moving average filter the ripple of the error signal is suppressed.

One further advantage of the present invention is that due to a superior response to load transients the size of the capacitors on a printed circuit board may be reduced.

BRIEF DESCRIPTION OF THE DRAWINGS

The apparatus and method according to the invention are described in more detail herein below by way of exemplary embodiments and with reference to the attached drawings, in which.

EMBODIMENT OF THE INVENTION

Figure 1:
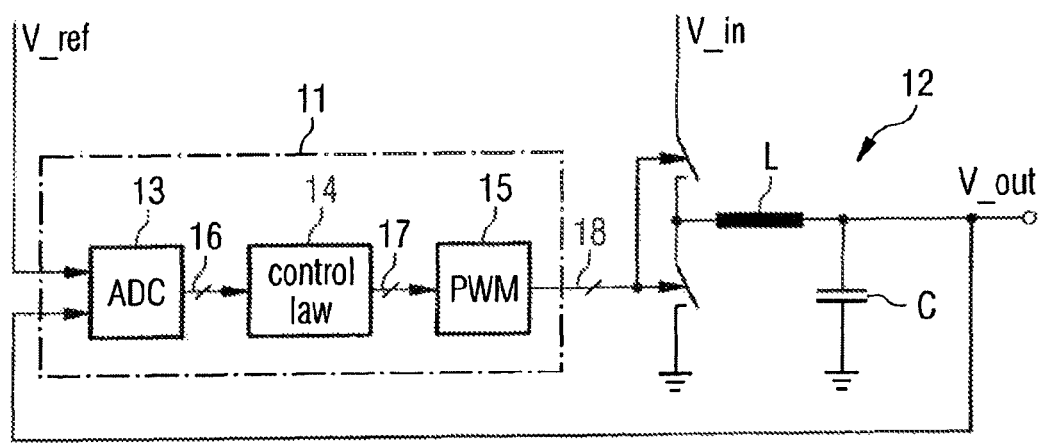
FIG. 1 shows a block diagram of PWM buck converter.

One embodiment of the present invention is a buck converter as shown in FIG. 1. The buck converter consists of a digital controller 11 and a power train 12. The digital controller comprises an ADC 13, the control law 14 and the PWM modulator 15. An error signal 16 is computed by differencing the output reference voltage V_ref and the output voltage V_out. The control law takes the error signal 16 as input and outputs the duty command ratio 17. The duty command ratio 17 controls the PWM modulator which generates a switching frequency 18. Switching frequency 18 and input voltage V_in drive the power train which outputs the output voltage V_out.

Figure 2:
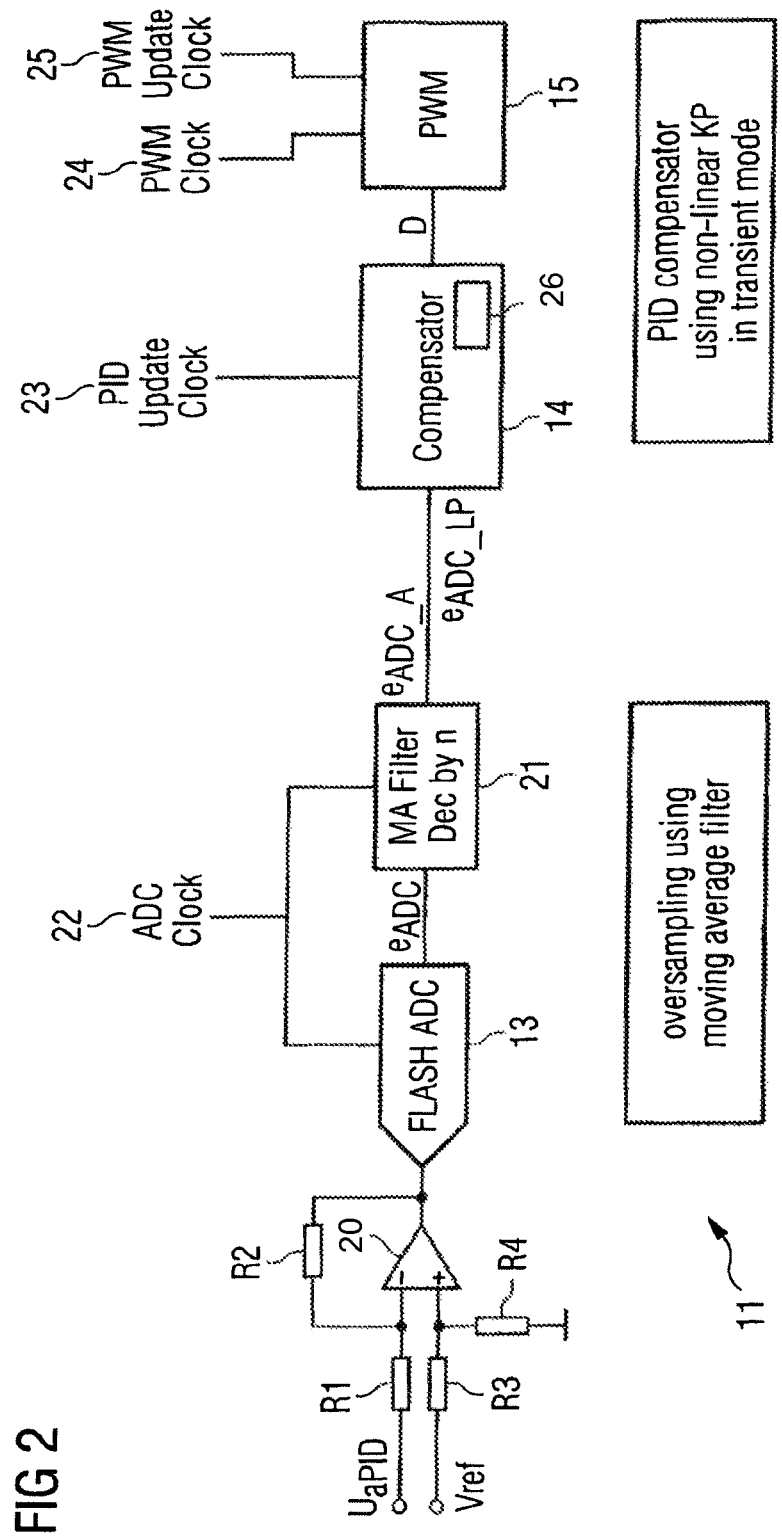
FIG. 2 shows a block diagram of a PWM signal generator.

FIG. 2 shows the digital controller 11 with a circuit 20 for computing and amplifying the error signal, the ADC 13 that quantizes the error signal, the control law implemented as PID compensator 14, the PWM modulator 15 and an additional moving average filter 21 for oversampling. Oversampling is used for detecting load transients and ripple suppression. The PID compensator 14 further comprises a unit 26 for non-linear KP selection. The ADC clock 22 operates at 16 Mhz, the PID update clock 23 at 48 Mhz and the PWM clock 24 at 500 kHz.

For the PID compensator 14 two sets of PID coefficients are provided, one for the transient mode and one for the steady state mode. The transient mode is entered by hardware upon load step transient detection. In transient mode the PID uses the transient coefficients KP_T, KI_T, KD_T, TD_T. Furthermore KP is adaptively selected in transient mode. The steady state mode is entered by hardware upon steady state detection. In steady state the PID uses the steady state coefficients KP_S, KI_S, KD_S, TD_$_S$.

Figure 3:
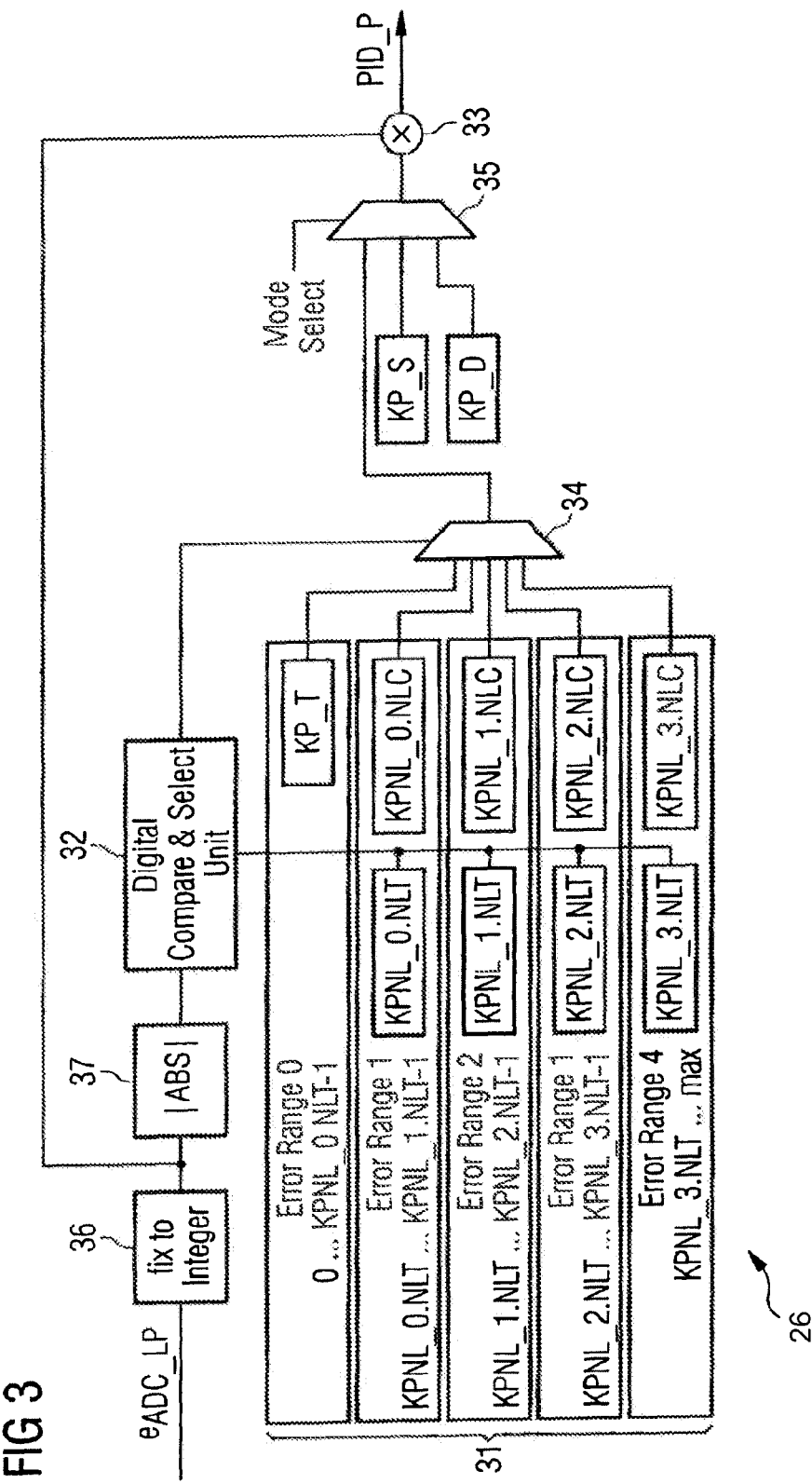
FIG. 3 shows a block diagram for non-linear KP selection

FIG. 3 shows the unit for non-linear KP selection 26. The unit 26 comprises a storage unit 31 for storing the non-linear KP gains and a digital compare and select unit 32 which compares the error signal with a plurality of thresholds that define error ranges, Error Range 0 . . . Error Range 4. For every Error Range 0 to 3 a non-linear KP gain KP_T, KPNL_0.NLC, KPNL_1.NLC, KPNL_2.NLC, KPNL_3.NLC is stored in unit 31. One of these KP gains is chosen by a multiplexer 34 which is controlled by the compare and select unit 32. A mode selection multiplexer 35 which is connected to the output of the multiplexer 34 selects one of the operating modes, steady state or load transient. The mode selection multiplexer 35 is controlled by the mode select signal. The mode select signal is generated by a mode detection unit.

While the present invention has been illustrated and described in detail in the drawings and foregoing description, such illustration and description are to be considered illustrative or exemplary and not restrictive. It will be understood that changes and modifications may be made by those of ordinary skill within the scope and spirit of the following claims

The invention claimed is:

1. A pulse width modulation power converter, comprising:
an output stage generating an output voltage according to a pulse width modulation signal and an input voltage by a switching element,
a source of an output voltage reference,
an analog digital converter connected to the output stage and to the source of the output voltage reference, sampling and amplifying a difference between the output voltage and the output voltage reference to generate an error signal,
a PID controller connected to the analog digital converter and to the switching element wherein the PID controller is configured by a set of PID coefficients, for determining a duty ratio, a pulse width modulator that generates the pulse width modulation signal according to the duty ratio,
a detector for detecting a steady state and a load transient,
wherein the pulse width modulation converter further comprises:
a memory for storing a first set of PID coefficients and a second set of PID coefficients,
a mode selector for selecting one of the first set of PID coefficients or the second set of PID coefficients for configuring the PID controller,
the first set of PID coefficients being selected in case the steady state is detected, and the second set of PID coefficients being selected in case the load transient is detected, wherein the detector for detecting the steady state and the load transient monitors the error signal and compares each value of the error signal to its predecessor by generating an error signal difference; and wherein a duty ratio difference of the duty ratio and its predecessor is computed, and, in case during an off-time of the pulse width modulation signal, the duty ratio difference exceeds a threshold, the pulse width modulator is triggered to start a new pulse width modulation period.

2. The pulse width modulation power converter according to claim 1, wherein the comparing of each value of the error signal to its predecessor by generating the error signal difference comprises taking into account a second derivative of the error signal.

3. The pulse width modulation power converter according to claim 1, further comprising a moving average filter for computing a moving average of the error signal.

4. The pulse width modulation power converter according to claim 1, further comprising a storage unit for storing a plurality of nonlinear gain coefficients KP of the second set of PID coefficients and adaptively selecting a nonlinear gain Kp in case of load transient detection.

5. The pulse width modulation power converter according to claim 1, wherein the analog digital converter is provided with a first clock frequency, the pulse width modulator is provided with a second clock frequency, and the first clock frequency is higher than the second clock frequency.

6. A control method for a power converter, comprising:
generating an output voltage according to a pulse width modulation signal and an input voltage;
generating an error signal by sampling the output voltage and differencing the sampled output voltage and an output voltage reference;
determining a duty ratio that defines a duty cycle of the pulse width modulation signal by a PID controlling algorithm;
generating the pulse width modulation signal by providing the duty ratio to a pulse width modulator;
detecting a steady state or a load transient,
selecting a first set of PID coefficients in case the steady state is detected and a second set of PID coefficients in case the load transient is detected, and wherein the step of detecting the steady state or the load transient comprises monitoring the error signal and comparing each value of the error signal to its predecessor by computing an error signal difference, and
computing a duty ratio difference of the duty ratio and its predecessor, and, in case, during an off-time of the pulse width modulation signal, the duty ratio difference exceeds a threshold, the pulse width modulator is triggered to start a new pulse width modulation period.

7. The control method according to claim 6, wherein the step of comparing each value of the error signal to its predecessor by computing an error signal difference comprises taking into account a second derivative of the error signal.

8. The control method according to claim 6, wherein the output voltage and/or the error signal is oversampled by sampling a plurality of error signals within one PWM period.

9. The control method according to claim 6, wherein a moving average of the sampled error signal is computed.

10. The control method according to claim 6, wherein a nonlinear gain KP is selected in case of load transient detection.

* * * * *